United States Patent [19]

Shimano

[11] 4,418,584
[45] Dec. 6, 1983

[54] GEAR CRANK FOR A BICYCLE

[75] Inventor: Keizo Shimano, Sakai, Japan

[73] Assignee: Shimano Industrial Company Limited, Osaka, Japan

[21] Appl. No.: 266,649

[22] Filed: May 26, 1981

[30] Foreign Application Priority Data

Jun. 11, 1980 [JP] Japan .............................. 55-81888[U]

[51] Int. Cl.³ .............................................. G05G 1/14
[52] U.S. Cl. .................................................. 74/594.2
[58] Field of Search ............................ 74/594.1, 594.2

[56] References Cited

U.S. PATENT DOCUMENTS

| | | | |
|---|---|---|---|
| 596,550 | 1/1898 | Siglow | 74/594.2 |
| 3,347,112 | 10/1967 | Thun | 74/594.2 |
| 3,377,883 | 4/1968 | Thun | 74/594.2 |
| 3,835,729 | 9/1974 | Tarutani | 74/594.2 X |
| 3,906,811 | 9/1975 | Thun | 74/594.1 |
| 4,331,043 | 5/1982 | Shinano | 74/594.2 |

Primary Examiner—Louis Rimrodt
Attorney, Agent, or Firm—Stevens, Davis, Miller & Mosher

[57] ABSTRACT

A gear crank comprising a one-piece crank and a chain gear, said crank having a vertical chain gear receiving face formed at the axially outer surface thereof at the one axial end side thereof, so that the chain gear is detachably mounted on the receiving face.

3 Claims, 5 Drawing Figures

GEAR CRANK FOR A BICYCLE

FIELD OF THE INVENTION

This invention relates to a gear crank for a bicycle, and more particularly to a gear crank comprising a one-piece crank which integrates a crank shaft with a pair of crank arms, and a chain gear fixed to the crank.

BACKGROUND OF THE INVENTION

Conventionally, a gear crank of the type described above and, as shown in FIG. 5, has a pair of crank arms b and c connected integrally with both axial ends of a crank shaft a so as to form a one-piece crank d. A flange e is provided at an end of one crank arm b at one axial end side of crank shaft a, a chain gear f is fitted onto the end of crank shaft a, and a ball holder g is screwed therewith, the ball holder g and flange e holding therebetween the chain gear f. A ball race i is mounted on one axial end of a bottom bracket h of a bicycle. The one-piece crank d is inserted through bottom bracket h from the other crank arm c and balls k are interposed between the ball holder g and the ball race i, so that crank shaft a is supported at its one axial end rotatably to bottom bracket h. At the other axial ends of bottom bracket h and crank shaft a are provided a ball race l and a ball holder m, and balls n are interposed therebetween, so that crank shaft a is supported at the other axial end thereof rotatably to bottom bracket h. A nut o is screwably tightened to crank shaft a outside ball holder m.

With this construction if a tooth breaks on the chain gear f, it needs to be exchanged, and the nut o, ball holder m and ball race l, must be removed following which the, one-piece crank d is drawn out of bottom bracket h, and thereafter chain gear f is removed from crank shaft a by unscrewing ball holder g. A new chain gear is mounted on crank shaft a and the one-piece crank d is reset to bottom bracket h. This exchange of chain gear f is very troublesome and impracticle for a user.

SUMMARY OF THE INVENTION

An object of the invention is to provide a gear crank very simple procedure to exchange a chain gear without requiring this dismounting of a one-piece crank from a bottom bracket of the bicycle.

The gear crank of the invention is so constructed that a crank shaft of a one-piece crank is provided at the axially outer surface of one axial end of the crank shaft with a face perpendicular to the axis of the crank shaft for receiving the chain gear. The receiving face is provided with a threaded portion extending axially of the crank shaft and the chain gear is provided with a first through bore through which a screw member is inserted to fix therewith the chain gear to the crank and a second through bore through which one crank arm is inserted, so that the chain gear is seated on the receiving face and the screw member screws with the threaded portion, whereby the chain gear is detachably fixed outside of the crank.

Therefore, the gear crank of the invention need not dismount the one-piece crank from the bottom bracket for renewing the chain gear when its tooth is broken. In other words, even an expert user can readily exchange the chain gear keeping the one-piece crank set to the bottom bracket.

These and other objects of the invention will become more apparent in the detailed description and example which follow.

DETAILED DESCRIPTION OF THE INVENTION

Figure 1:
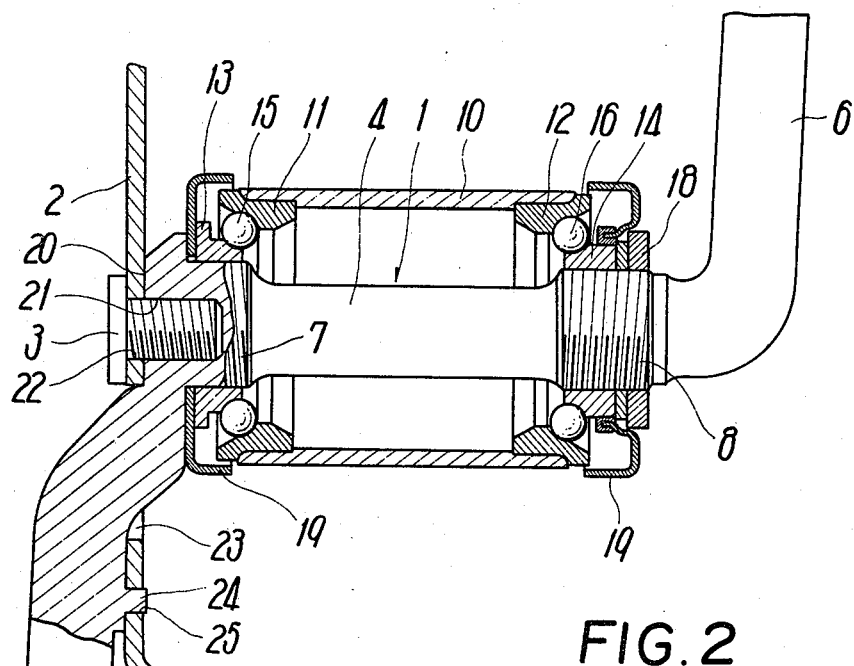
FIG. 1 is a partially omitted longitudinal sectional view of an embodiment of a gear crank of the invention.
Figure 2:
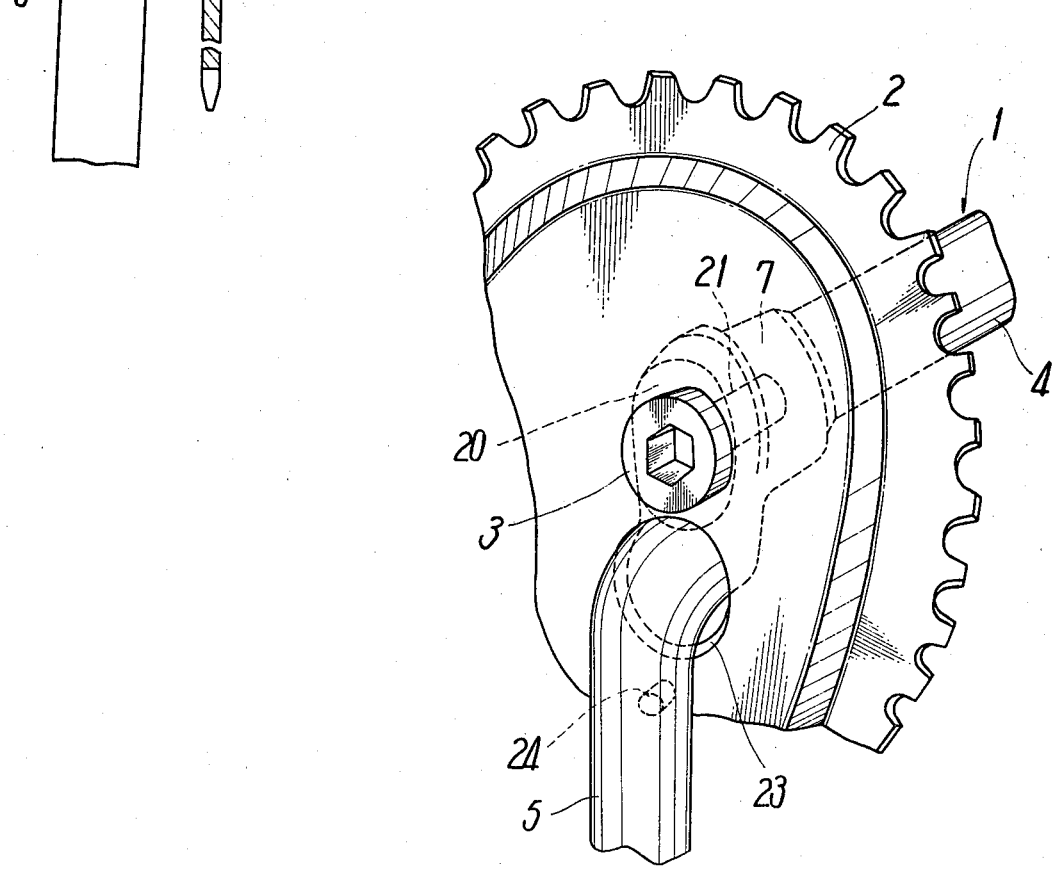
FIG. 2 is a partially omitted perspective view of the FIG. 1, embodiment.
Figure 3:
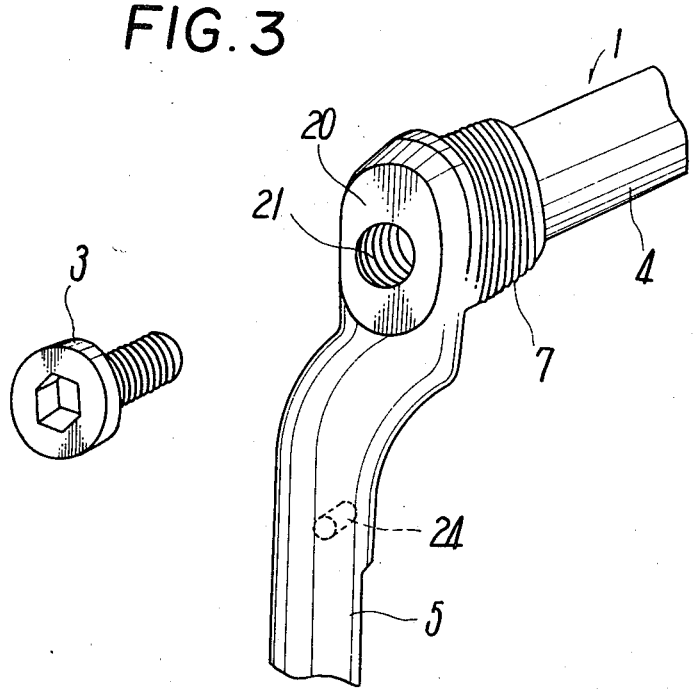
FIG. 3 is a perspective view of the gear crank in FIG. 2, from which a chain gear is removed.

A gear crank of the invention comprises a one-piece crank 1, a chain gear 2 and a screw member 3 for fixing chain gear 2 to crank 1. The crank 1 comprises a crank shaft 4 and a pair of crank arms 5 and 6 fixed to both axial ends of crank shaft 4, the crank shaft 4 being provided at the outer peripheries of both axial ends thereof with screw threads 7 and 8 respectively, the crank arms 5 and 6 being integral with crank shaft 4 at a phase difference of 180°.

Figure 5:
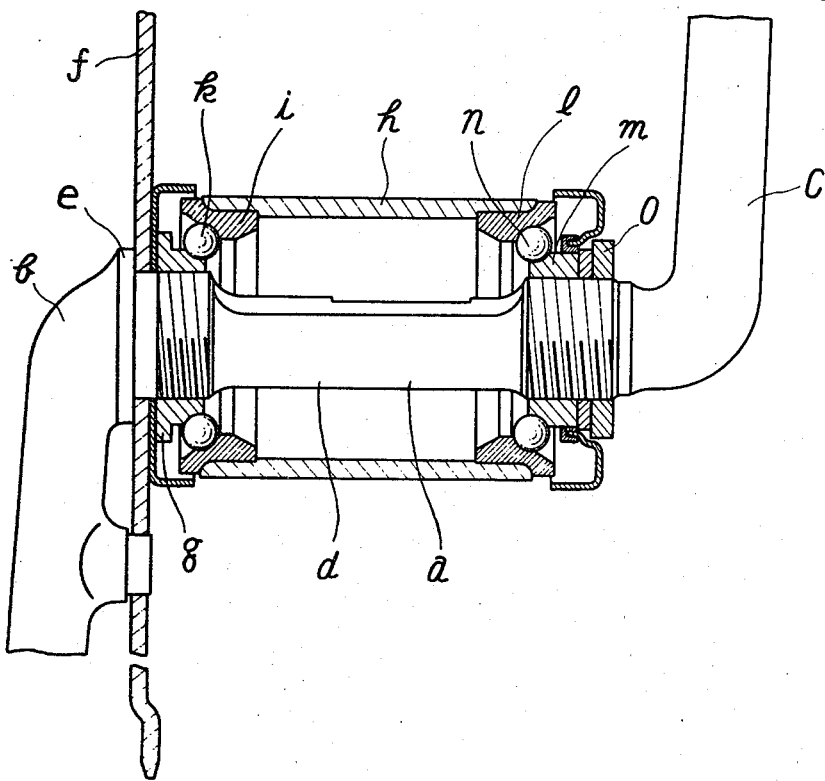
FIG. 5 is a partially omitted longitudinal sectional view of an exemplary conventional gear crank.

Referring to FIG. 1, the one-piece crank 1, like the conventional one piece crank shown in FIG. 5, is supported rotatably to a cylindrical bottom bracket 10 of the bicycle through ball races 11 and 12 provided at the inner peripheries of both axial ends of bottom bracket 10, ball holders 13 and 14 screwed with screw threads 7 and 8 at crank shaft 4, and balls 15 and 16 interposed between the ball races 11 and 12 and the ball holders 13 and 14 respectively. In addition, reference numeral 18 designates a lock nut and 19 designates a sealing member.

A face 20 for receiving chain gear 2 is formed at the axially outer surface of one axial end of crank shaft 4 and at the root of one crank arm 5, and a threaded bore 21 extending axially inwardly of crank shaft 4 is provided at the center of receiving face 20.

At the center of chain gear 2 is provided a first through bore 22 through which the screw member 3 passes, and at a position radially outward from the center of bore 22 is provided a second through bore 23 through which one crank arm 5 passes.

The chain gear 2 is fitted onto crank arm 5 from the utmost end thereof through the second through bore 23 and seated at receiving face 20, and a headed screw member 3 is inserted through the first through bore 22 from its outside and screws with threaded bore 21 at crank shaft 4, thereby fixing chain gear 2 to one-piece crank 1.

In addition, a projection 24 is provided at the inner surface of crank arm 5 and an engaging bore 25 is provided at chain gear 2 opposite to projection 24, so that projection 24 engages with engaging bore 25 so that chain gear 2 integrally rotates with crank arm 5.

The gear crank of the invention constructed as described above is mounted on bottom bracket 10 in the following manner. Ball holder 13 screws with screw thread 7 of crank shaft 4 at the crank arm 5 side (the left-hand side in FIG. 1) and balls 15 are placed on ball race 11, and then one-piece crank 1 is inserted through bottom bracket 10 from crank arm 6 and balls 15 are interposed between the ball race 11 and the ball holder 13, thereby rotatably supporting crank shaft 4 at one axial end thereof; and ball holder 14 is inserted onto crank arm 6 from the utmost end thereof and screwed with screw thread 8 of crank shaft 4 at the right-hand side in FIG. 1 and balls 16 are interposed between the ball holder 14 and the ball race 12 mounted on the other axial end of bottom bracket 10, so that crank shaft 4 is supported at the other axial end thereof rotatably to bottom bracket 10, and lock nut 18 is screwed with crank shaft 4 outside of ball holder 14, thus fixing one-piece crank 1 to bottom bracket 10.

The chain gear 2 is inserted through its second through bore 23 onto crank arm 5 and seated on receiving face 20 and then screw member 3 is inserted through the first through bore 22 and screws with threaded bore 21, thereby fixing chain gear 2 to one-piece crank 1.

The chain gear 2, if its tooth is broken, is drawn out of crank arm 5 after removing screw member 3 and a new chain gear is fixed to one-piece crank 1 in the same steps as abovementioned. Therefore, when chain gear 2 is exchanged, there is no need of dismounting one-piece crank 1 from bottom bracket 10 as conventional, whereby chain gear 2 is very readily exchangable while crank 1 remains set to bottom bracket 10, enabling even an inexperienced user to replace it by himself.

Figure 4:
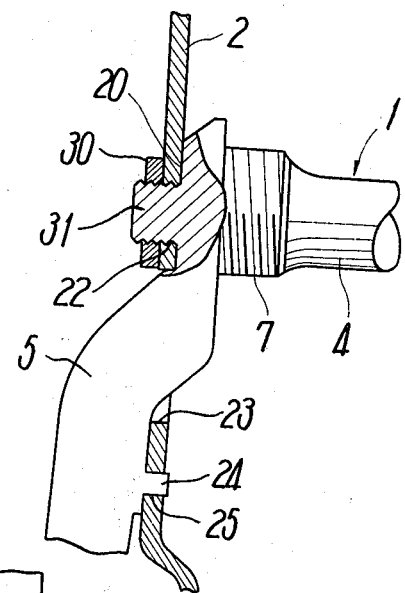
FIG. 4 is a partially cutaway front view only of a principal portion of a modified embodiment of the invention.

Alternatively, a screw bolt 31, as shown in FIG. 4, may be formed at receiving face 20 and a nut 30 may be used as the screw member for fixing chain gear 2 to crank 1.

While an embodiment of the invention has been shown and described, the invention is not limited to the specific construction thereof, which is merely exemplary of the invention. Accordingly, the invention is not limited by the specification description or drawings, but is only limited by the scope of the claims appended hereto.

What is claimed is:

1. A gear crank for a bicycle, comprising: a one-piece crank having a crank shaft and a pair of integral crank arms; a chain gear; and a screw member for fixing said chain gear to said crank, said crank having at the axially outer surface of said crank shaft at the one axial end side thereof a receiving face comprising a vertical face to receive thereat said chain gear, said receiving face having a threaded portion extending axially of said crank shaft, said chain gear having a first through bore for said screw member and a second through bore for one of said crank arms and being seated at said receiving face, said screw member screwing with said threaded portion to thereby detachably fix said chain gear to said crank.

2. A gear crank for a bicycle according to claim 1, wherein said threaded portion at said receiving face provided at said crank is a threaded bore and, said screw member is a bolt.

3. A gear crank for a bicycle according to claim 1, wherein said threaded portion at said receiving face provided at said crank is a bolt and, said screw member is a nut.

* * * * *